United States Patent
Ran et al.

(10) Patent No.: US 11,775,760 B2
(45) Date of Patent: Oct. 3, 2023

(54) MAN-MACHINE CONVERSATION METHOD, ELECTRONIC DEVICE, AND COMPUTER-READABLE MEDIUM

(71) Applicant: TENCENT TECHNOLOGY (SHENZHEN) COMPANY LIMITED, Shenzhen (CN)

(72) Inventors: Qiu Ran, Shenzhen (CN); Xiao Zhou, Shenzhen (CN); Cheng Niu, Shenzhen (CN); Jie Zhou, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 234 days.

(21) Appl. No.: 17/013,705

(22) Filed: Sep. 7, 2020

(65) Prior Publication Data

US 2020/0401765 A1   Dec. 24, 2020

Related U.S. Application Data

(63) Continuation of application No. PCT/CN2019/101038, filed on Aug. 16, 2019.

(30) Foreign Application Priority Data

Aug. 29, 2018 (CN) .......................... 201810995868.8

(51) Int. Cl.
*G06F 40/289* (2020.01)

(52) U.S. Cl.
CPC .................. *G06F 40/289* (2020.01)

(58) Field of Classification Search
CPC .. G06F 40/289; G06F 16/3329; G06F 40/284; G06F 40/30; G06F 40/279
USPC ........................................................... 704/9
See application file for complete search history.

(56) References Cited

U.S. PATENT DOCUMENTS

| | | | |
|---|---|---|---|
| 10,360,265 B1 * | 7/2019 | Agarwal | ............ G10L 15/1815 |
| 10,810,272 B2 | 10/2020 | Liu et al. | |
| 2015/0331851 A1 | 11/2015 | Poli et al. | |

FOREIGN PATENT DOCUMENTS

| | | | |
|---|---|---|---|
| CN | 101719129 A | * | 6/2010 |
| CN | 102760128 A | | 10/2012 |
| CN | 105159996 A | | 12/2015 |
| CN | 105243152 A | | 1/2016 |
| CN | 105653704 A | | 6/2016 |

(Continued)

OTHER PUBLICATIONS

The World Intellectual Property Organization (WIPO) International Search Report for PCT/CN2019/101038 dated Oct. 29, 2019 5 Pages (including translation).

(Continued)

*Primary Examiner* — Thierry L Pham
(74) *Attorney, Agent, or Firm* — ANOVA LAW GROUP, PLLC (57) ABSTRACT

A man-machine conversation method includes: extracting a keyword from input information of a user; determining a candidate article according to the keyword; obtaining a plurality of sentences in the candidate article, and determining a score of each of the plurality of sentences; extracting part of the plurality of sentences based on the score of each of the plurality of sentences; and generating return information that includes the extracted part of the plurality of sentences.

19 Claims, 7 Drawing Sheets

(56) References Cited

FOREIGN PATENT DOCUMENTS

| | | | |
|---|---|---|---|
| CN | 105653738 | A | 6/2016 |
| CN | 106446109 | A | 2/2017 |
| CN | 107066633 | A | 8/2017 |
| CN | 107562774 | A | 1/2018 |
| CN | 107862004 | A | 3/2018 |
| CN | 109284357 | A | 1/2019 |
| TW | 420778 | B | 2/2001 |

OTHER PUBLICATIONS

Taiwan Intellectual Property Office (TIPO) Office Action 1 for 108129270 dated Apr. 16, 2020 11 Pages (including translation).
The State Intellectual Property Office of the People's Republic of China (SIPO) Office Action 2 for for 201810995868.8 Feb. 17, 2022 9 Pages (including translation).
The State Intellectual Property Office of the People's Republic of China (SIPO) Office Action 1 for for 201810995868.8 Jul. 12, 2021 11 Pages (including translation).

\* cited by examiner

MAN-MACHINE CONVERSATION METHOD, ELECTRONIC DEVICE, AND COMPUTER-READABLE MEDIUM

RELATED APPLICATIONS

This application is a continuation application of PCT Patent Application No. PCT/CN2019/101038, filed on Aug. 16, 2019, claims priority to Chinese Patent Application No. 201810995868.8, entitled "MAN-MACHINE CONVERSATION METHOD AND APPARATUS, ELECTRONIC DEVICE, AND COMPUTER-READABLE MEDIUM" and filed with the China National Intellectual Property Administration on Aug. 29, 2018, both of which are incorporated herein by reference in their entirety.

FIELD OF THE TECHNOLOGY

Embodiments of the present disclosure relate to the field of computer information processing, and specifically, to a man-machine conversation method and apparatus, an electronic device, and a computer-readable medium.

BACKGROUND OF THE DISCLOSURE

A chatterbot is a program used for simulating a human conversation or chat. Currently, chatterbots are widely applied in various instant messaging platforms, learning and education platforms, and various information service platforms. The chatterbot may chat with a user based on knowledge in a database, and usually, a researcher places answers that the researcher is interested in into a database. When a question is thrown to the chatterbot, the chatterbot finds a most proper answer from the database, and replies the answer to its chatting partner. In this simple conversation-type chatting manner, a range in which the user obtains information is relatively narrow, and the manner gradually loses interest in the market.

With the application of a neural network of sequence data in the fields of artificial intelligence and translation and communication, the chatterbot may use words said by the user as an input of a model, and use a sentence outputted by the model as a reply for man-machine interaction.

SUMMARY

Embodiments of the present disclosure provide a man-machine conversation method and apparatus, an electronic device, and a computer-readable medium, to enable a robot to generate a reply with an information amount in a man-machine conversation process, and assist a user to change opinions with external information.

Other features and advantages of the embodiments of the present disclosure will become apparent through the following detailed description, or partially acquired through practices of the embodiments of the present disclosure.

An embodiment of the present disclosure provides a man-machine conversation method, performed by an electronic device, the method including: extracting a keyword from input information of a user; determining a candidate article according to the keyword; obtaining a plurality of sentences in the candidate article, and determining a score of each of the plurality of sentences; and extracting part of the plurality of sentences based on based on the score of each of the plurality of sentences; and generating return information that includes the extracted part of the plurality of sentences An embodiment of the present disclosure provides an electronic device, including: one or more processors; and a storage apparatus, configured to store one or more programs. The one or more processors are, when executing the one or more programs, configured to perform: extracting a keyword from input information of a user; determining a candidate article according to the keyword; obtaining a plurality of sentences in the candidate article, and determining a score of each of the plurality of sentences; extracting part of the plurality of sentences based on the score of each of the plurality of sentences; and generating return information that includes the extracted part of the plurality of sentences.

An embodiment of the present disclosure provides a non-transitory computer-readable medium, storing a computer program, the program, when executed by a processor, cause the processor to perform: extracting a keyword from input information of a user; determining a candidate article according to the keyword; obtaining a plurality of sentences in the candidate article, and determining a score of each of the plurality of sentences; extracting part of the plurality of sentences based on the score of each of the plurality of sentences; and generating return information that includes the extracted part of the plurality of sentences.

BRIEF DESCRIPTION OF THE DRAWINGS

The foregoing and other objectives, features, and advantages of the present disclosure will become more apparent from the detailed description of exemplary embodiments of the present disclosure with reference to the accompanying drawings. The accompanying drawings in the following description are merely some embodiments of the present disclosure, and a person of ordinary skill in the art may still derive other drawings from these accompanying drawings without creative efforts.

DESCRIPTION OF EMBODIMENTS

Exemplary embodiments are described more fully with reference to accompanying drawings. However, the exemplary embodiments can be implemented in various forms and are not be understood as limited to embodiments described herein; on the contrary, providing these embodiments will make the present disclosure more comprehensive and complete, and comprehensively convey a concept of the exemplary embodiments to a person skilled in the art. The same reference numbers in the drawings represent the same or similar parts, and therefore, repeated descriptions thereof are omitted.

In addition, described features, structures or features may be combined in one or more embodiments in any suitable manner. In the following description, many specific details are provided to give a full understanding of the embodiments of the present disclosure. However, a person skilled in the art will realize that the technical solution of the present disclosure can be practiced without one or more specific details, or other methods, components, apparatuses, steps and the like can be adopted. In other cases, public methods, apparatuses, implementations or operations are not shown or described in detail to avoid blurring aspects of the present disclosure.

The block diagram shown in the accompanying drawings is merely a functional entity and does not necessarily correspond to a physically independent entity. That is, these functional entities can be implemented in the form of software, in one or more hardware modules or integrated circuits, or in different networks and/or processor apparatuses and/or microcontroller apparatuses.

A flowchart shown in the accompanying drawings is only an exemplary description, not necessarily including all contents and operations/steps, nor being carried out in the order described. For example, some operations/steps may be further decomposed, while some operations/steps may be merged or partially merged, so the actual execution order may change according to the actual situation.

It is to be understood that the terms such as "first", "second", and "third" used in this specification may be used for describing various components. However, the components are not limited by the terms. The terms are used for distinguishing a component from another component. Therefore, the first component discussed in the following may be referred to as a second component without departing from the teaching of the concept of the present disclosure. As used in this specification, the term "and/or" used includes any or all combinations of one or more related listed items.

A person skilled in the art may understand that, the accompanying drawings are merely schematic diagrams of exemplary embodiments, and modules or processes are not necessarily required for implementing embodiments of the present disclosure, and therefore cannot be used for limiting the protection scope of the embodiments of the present disclosure.

In a process of man-machine interaction based on a model, content replied by a robot is relatively empty, and does not have an information amount, and there is no extension of actual content. Actual experience of a user is general, and the method is limited during actual application.

Currently, technologies commonly used for chatting of a chatterbot include a generative approach based on a sequence to sequence (seq2seq) neural network model. The seq2seq neural network model is an end-to-end model, and can process a sequence. The model uses one sequence as an input and uses another sequence as an output, and is usually used in the field of machine translation and conversation. However, in the generative approach based on a seq2seq neural network model, first, a seq2seq model is trained on a large amount of conversation training data, and then when a user chats with the chatterbot, words said by the user are directly used as an input of the model, and then an output of the model is used as a reply to the user.

The disadvantage of the generative approach based on a seq2seq model is that, a large amount of conversation training data is required when the seq2seq model is trained, and because the data has a wide range and a large data amount, it is relatively difficult to obtain the training data of the seq2seq neural network model in real life.

When the chatterbot using the generative approach based on a seq2seq model chats, answers to the user are empty, and do not have an information amount and actual content, and the method is limited during actual application. For example, when the user wants to learn of external information or change opinions or viewpoints about some events with the chatterbot, the method can be used only for simply replying or avoiding user questions, and cannot be used for answering the user questions directly, let alone provide another constructive opinion having an information amount.

In view of this, embodiments of the present disclosure provide a man-machine conversation method, to extract, according to a question of a user, a key sentence from a related article as a reply, to exchange information, opinions, viewpoints, or the like.

The following describes the embodiments of the present disclosure in detail.

Figure 1:
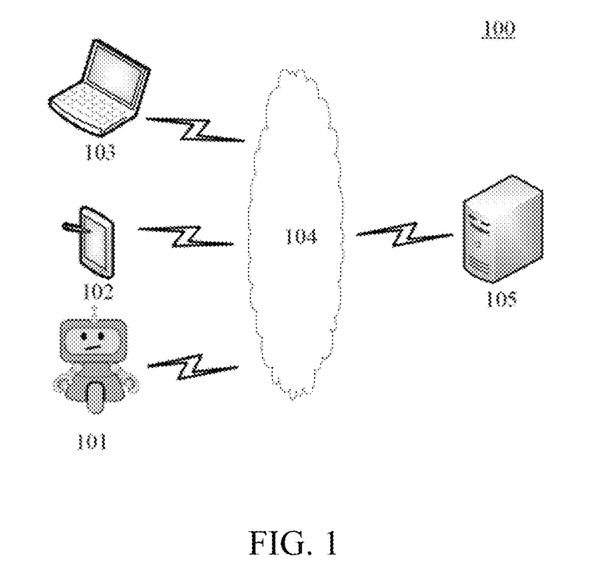
FIG. 1 is a block diagram of a system of a man-machine conversation method and apparatus according to an exemplary embodiment.

FIG. 1 is a block diagram of a system of a man-machine conversation method and apparatus according to an exemplary embodiment.

As shown in FIG. 1, a system architecture 100 may include terminal devices 101, 102, and 103, a network 104 and a server 105. The network 104 is configured to provide a communication link medium between the terminal devices 101, 102, and 103 and the server 105. The network 104 may include various connection types, such as a wired or wireless communication link, or a fiber optic cable.

A user may use the terminal devices 101, 102, and 103 to interact with the server 105 through the network 104, to receive or send messages, or the like. Various communication client applications, for example, a shopping application, a webpage browser application, a searching application, an instant messaging tool, an email client, and social platform software, may be installed on the terminal devices 101, 102, and 103.

The terminal devices 101, 102, and 103 may be various electronic devices having displays and supporting webpage browse, including but not limited to, smartphones, smart speakers, tablet computers, laptop portable computers, desktop computers, and the like.

The server 105 may be a server that provides various services, for example, a server that provides background data support for a chatterbot invoked by the user by using the terminal devices 101, 102, and 103. The server for background data support may process, such as analyze received questions of the user, and feed back a processing result (for example, return information or return voice) to the terminal devices.

The terminal devices 101, 102, and 103 may extract a keyword from voice input information of the user, and may further extract a keyword from text input information of the user.

The terminal devices 101, 102, and 103 may extract the keyword from the input information of the user, and may determine a candidate article according to the keyword. The terminal devices 101, 102, and 103 may obtain a plurality of sentences in the candidate article, and determine a score of each of the plurality of sentences. The terminal devices 101, 102, and 103 may extract part of the plurality of sentences based on the score of each of the plurality of sentences, to generate return information. The return information may include the extracted part of the plurality of sentences.

The terminal devices 101, 102, and 103 may forward the input information of the user to the server 105 for processing. The server 105 may extract the keyword from the input information of the user. The server 105 may determine the candidate article according to the keyword. The server 105 may obtain a plurality of sentences in the candidate article, and determine a score of each of the plurality of sentences. The server 105 may extract part of the plurality of sentences based on a score result, to generate return information. The server 105 may send the return information to the terminal devices 101, 102, and 103, to respond to the input information of the user. After obtaining the input information from the user, all remaining steps may be automatically completed by the terminal devices and/or the server.

The man-machine conversation method provided in one embodiment of the present disclosure may be performed by the server 105 and/or the terminal devices 101, 102, and 103. Correspondingly, a man-machine conversation apparatus may be disposed in the server 105 and/or the terminal devices 101, 102, and 103. A request end provided for the user for information input is usually located in the terminal devices 101, 102, and 103.

The man-machine conversation method and apparatus according to the embodiments of the present disclosure may be applied to a related product of a chatterbot, such as a smart speaker or a chatterbot in instant messaging software, and are mainly applied to a scenario of chatting between the user and the chatterbot. The man-machine conversation method and apparatus according to the embodiments of the present disclosure may implement functions such as news round-up broadcast or exchange of opinions.

In an application scenario, learning of news is a common requirement of a user, and generally, broadcasting complete news occupies a relatively long time, making a user lose patience, and reducing user experience. In this case, it appears to be necessary to broadcast news round-up. For example, when the user wants to learn of recent hot news, the user may say "I want to listen to recent hot news" or another expression such as "Is there any hot news recently" to the chatterbot. According to the man-machine conversation method and apparatus in the embodiments of the present disclosure, several hot news articles are found from recent official account articles, and several key sentences in the articles are extracted and broadcast to the user as round-up. Alternatively, when the user wants to learn of specific aspects, such as news about the Sino-US trade war, the user may say "How is the situation of the Sino-US trade war at present" to the chatterbot. According to the man-machine conversation method and apparatus in the embodiments of the present disclosure, key sentences are extracted from several pieces of news that are found and that are most relevant to the aspect, and the key sentences are summarized into round-up for reply to the user.

Figure 2:
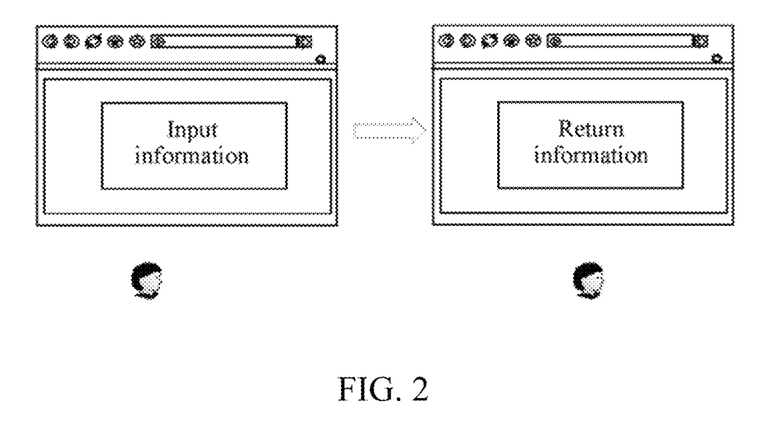
FIG. 2 is a diagram of an application scenario of a man-machine conversation method according to an exemplary embodiment.

FIG. 2 is a diagram of an application scenario of a man-machine conversation method according to an exemplary embodiment. In the man-machine conversation scenario shown in FIG. 2, a user may chat with a chatterbot in a dialog interface system, such as an instant chatting window or on an information exchange platform. The user may input a user request, such as a question through text, and the chatterbot performs data processing on the question of the user using a plurality of dialog system rules/algorithms (such as language processing, sentence extraction from predetermined platforms, etc.), and then returns, based on the plurality of dialog system rules/algorithms, a response to the user request, such as text information and/or voice information.

During chatting, the user may ask opinion exchange questions such as a viewpoint about a thing to the chatterbot, such as "What is your opinion about the college entrance examination reform this time". According to the man-machine conversation method and apparatus in the embodiments of the present disclosure, related articles are searched for according to the information asked by the user, to form return information to reply to the user, and the user may obtain the recent college entrance examination policy and the college entrance examination score, and the like from the return information. According to the man-machine conversation method and apparatus in the embodiments of the present disclosure, the chatterbot can directly answer like a real person, rather than simply reply "Good" and other similar sentences, or avoid the user question. For the question asked by the user, according to the man-machine conversation method and apparatus in the embodiments of the present disclosure, articles about comments on the college entrance examination reform may be extracted from a large quantity of hot articles, and key comment sentences are extracted therein, and the key comment sentences are organized into reply information as a viewpoint to be expressed by the robot.

Figure 3:
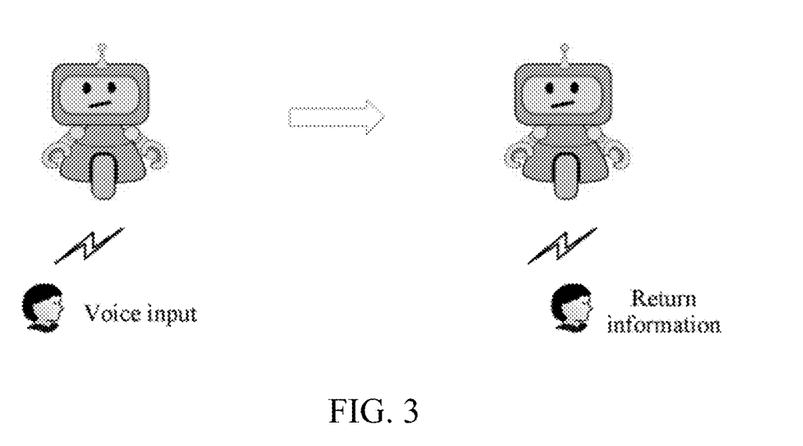
FIG. 3 is a diagram of an application scenario of a man-machine conversation method according to an exemplary embodiment.

FIG. 3 is a diagram of an application scenario of a man-machine conversation method according to an exemplary embodiment. In the man-machine conversation scenario shown in FIG. 3, a user may chat with a chatterbot through a voice input terminal, and the voice input terminal may be a device such as a smart speaker or an intelligent robot. The user may ask a question through voice, and the chatterbot first converts the voice question of the user into text information, then performs data processing, and returns text and/or voice information as a response to the question of the user.

For example, when the user asks "How is the movie XXX?", according to the man-machine conversation method and apparatus in the embodiments of the present disclosure, key comment sentences in related articles may be extracted in a movie information platform, and then return information is formed according to the sentences to reply to the user. The user may obtain a movie brief introduction or comment content from the return information, rather than obtain a simple reply "Good-looking" as in the generative approach based on a seq2seq model and similar answers.

According to the man-machine conversation method and apparatus in the embodiments of the present disclosure, key sentences may be extracted from related articles according to the user question as a reply, to implement exchange of user opinions, external information, opinions, or viewpoints.

Figure 4:
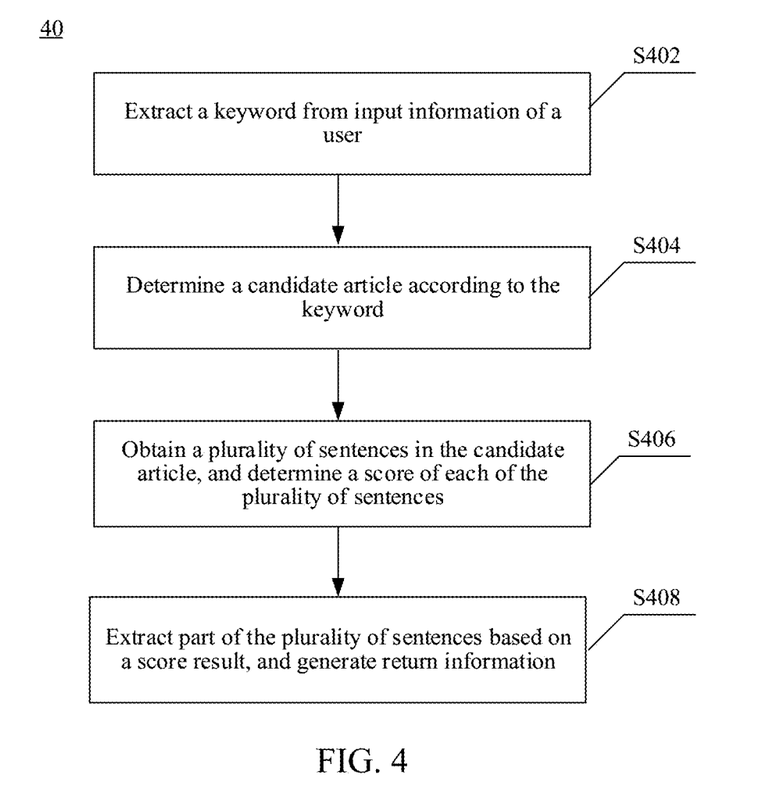
FIG. 4 is a flowchart of a man-machine conversation method according to an exemplary embodiment.

FIG. 4 is a flowchart of a man-machine conversation method according to an exemplary embodiment. The method may be performed by an electronic device such as the foregoing server or terminal devices. The man-machine conversation method 40 includes at least step S402 to step S408.

As shown in FIG. 4, in step S402, a keyword is extracted from input information of a user. The keyword may be extracted from voice input information of the user, or from text input information of the user.

In an embodiment, the extracting a keyword from text input information of the user includes: performing word segmentation on the input information, to obtain a plurality of words; determining word vectors of the plurality of words; determining word similarities between the plurality of words through cosine similarities and the word vectors; determining importance levels of the plurality of words according to the word similarities; and determining the keyword according to a sorting order of the importance levels. There may be one or more keywords, and this is not limited in the embodiments of the present disclosure. Content related to keyword extraction will be described in detail in the subsequent embodiment of FIG. 5.

In an embodiment, when the keyword is extracted from the voice input information of the user, audio information inputted by the user through voice may be specifically received through a smart speaker, an intelligent robot, or another audio device having a sound receiving function. Audio recognition is performed on the audio information of the user after the audio data is obtained, to obtain the keyword in the input information of the user. The audio information of the user may alternatively be converted into text information through audio recognition, to extract the keyword in the text information according to the method in the previous embodiment.

As shown in FIG. 4, in step S404, a candidate article is determined according to the keyword. Retrieval may be performed in a predetermined platform according to the keyword, to determine the candidate article. For example, several hot news articles related to the keyword may be found in recent official account articles; the keyword may also be searched for in mainstream searching engines, and sorting is performed according to retrieval results, and the candidate article is determined in search results according to a descending sorting order. There may be one or more candidate articles, and this is not limited in the embodiments of the present disclosure.

As shown in FIG. 4, in step S406, a plurality of sentences in the candidate article are obtained, and a score of each of the plurality of sentences is determined. Step S406 may specifically include: determining a first score according to an importance level of each of the plurality of sentences in the article; determining a second score according to a similarity between each of the plurality of sentences and the input information; and determining the score according to the first score and the second score.

In an embodiment, the determining a first score according to an importance level of each of the plurality of sentences in the article, where the importance level of the sentence may be obtained through a text sorting algorithm specifically includes: determining a sentence vector of each of the plurality of sentences; determining a sentence similarities between sentence vectors of the plurality of sentences; and obtaining the importance level of each sentence in the article based on the sentence similarities, to determine the first score.

In an embodiment, the text sorting algorithm may be TextRank in Automatic Summarization. In the TextRank, the candidate article is divided into several constituent units (words or sentences) to establish a graphical model, and important components in the candidate article are sorted by using a voting mechanism, so that the importance level of each sentence in a document can be scored only by using information of the candidate article. Content related to determining the importance level of the sentence in the article by using the TextRank algorithm will be described in detail in the subsequent embodiment of FIG. 7.

Because scoring by using the TextRank reflects only the semantic importance level of the corresponding sentence in the article, and the correlation with the user question is not considered, sentences cannot be extracted directly according to the importance. Therefore, a weighted average of word vectors of keywords in the question may be used as a vector representation of the user question, and a cosine similarity between each sentence vector and the vector is used as a similarity between each sentence and the user question, to determine the second score.

Figure 7:
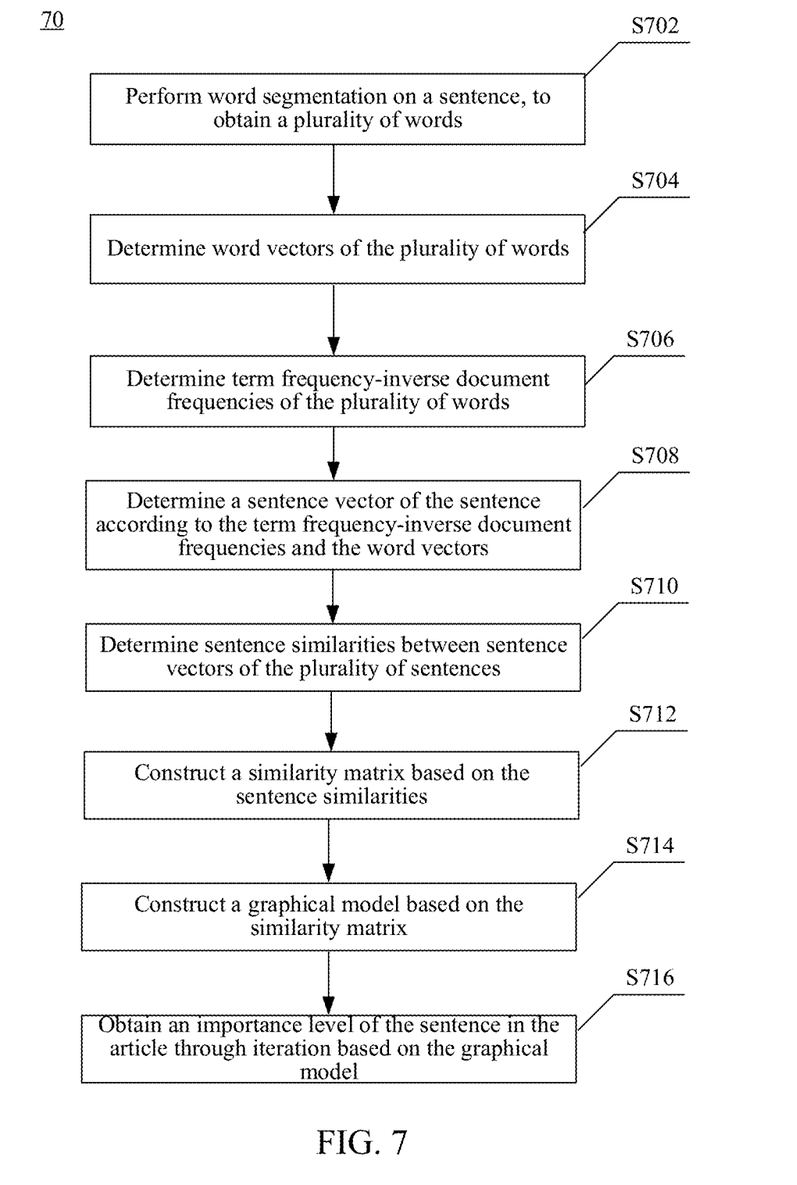
FIG. 7 is a flowchart of a man-machine conversation method according to another exemplary embodiment.

In an embodiment, the determining a second score according to a similarity between each of the plurality of sentences and the input information includes: determining an information vector of the input information of the user; determining a sentence vector of each of the plurality of sentences; determining a similarity between the information vector and the sentence vector of each sentence through a cosine similarity; and determining the second score of a sentence through the similarity between the information vector and the sentence vector of the sentence. Specific steps of calculating the similarity between the sentence in the candidate article and the input information are similar to the process in FIG. 7: the input information of the user is also used as a sentence, and then similarity comparison between the sentences of the candidate article in FIG. 7 is replaced with similarity comparison between the input information of the user and the sentence. This is not described in detail herein in this embodiment of the present disclosure.

In an embodiment, the score is determined according to the first score and the second score. In the candidate article, a weighted sum of the importance level of each sentence and the similarity (e.g. similarity with the input information) may be used as a final score of the sentence, and then sorting is performed. For example, the first score is A, the second score is B, and a final score C of the sentence may be represented as:

$$C=qA+(1-q)B;$$

where q is a weight coefficient, a value range of q is $q\in[0,1]$; when the value of q is 1 or 0, the total score C may be determined as the first score A or the second score B.

As shown in FIG. 4, in step S408, part of the plurality of sentences are extracted based on a score result, to generate return information. The plurality of sentences may be sorted based on the score result, and part of the plurality of sentences are extracted in sequence to generate the return information.

In an embodiment, the extracting part of the plurality of sentences in sequence to generate the return information includes: performing post-processing on the part of sentences to generate the return information. Specifically, scores (the first score and the second score) of the sentences of the candidate article may be sorted, and sentences with highest scores are preferentially selected and organized into a reply, and natural language processing such as anaphora resolution and removal of conjunctions in the first part of the first sentence of a summary is performed, to generate a text result for ease of understanding by the user, and then the text result is returned to the user.

The anaphora resolution is important content of the natural language processing, and is a problem of determining a noun phrase referred to by a pronoun in the article. In an embodiment of the present disclosure, in the anaphora resolution, an antecedent candidate directory is first constructed, and then a one-out-many selection is performed from candidates. Specifically, methods for anaphora resolution include: syntax-based anaphora resolution, a corpus-based method, a statistical method such as a statistical machine learning method, and the like. The process of anaphora resolution in one embodiment of the present disclosure may be implemented by using one or more of the foregoing methods.

According to the man-machine conversation method in one embodiment of the present disclosure, articles related to the user question are retrieved, and then part of sentences are extracted in the related articles, to generate return information having essential content and an information amount, so that the robot generates an answer having an information amount in the man-machine conversation process, to assist the user in exchanging opinions with external information.

In a scenario of a non-task conversation, namely, chatting, when a user asks the chatterbot a question, according to the man-machine conversation method in one embodiment of the present disclosure, first, several candidate articles related to the user question are extracted through retrieval, and importance levels of sentences in the candidate articles are calculated by using a text sorting algorithm, and then the correlation between each sentence and the user question is comprehensively considered, to generate final scores and a sorting order of the sentences in the candidate articles, and finally several key sentences are extracted from the candidate articles according to the scores and are organized into a summary to return to the user as an answer. According to the descriptions of the foregoing content, according to the man-machine conversation method in one embodiment of the present disclosure, key sentences in related articles can be extracted, so that the reply content of the chatterbot contains information and is not empty. According to the man-machine conversation method in one embodiment of the present disclosure, when the return information is generated, the importance level of an extracted sentence in a candidate article and a correlation between the extracted sentence and the user question are comprehensively considered, so that return information that is not only close to the user question but also includes an information amount can be obtained.

It may be understood that, this embodiment of the present disclosure describes specific examples of how to form and use, but the principles of this embodiment of the present disclosure are not limited to any detail of the examples. On the contrary, based on the teaching of this embodiment of the present disclosure, the principles can be applied to many other embodiments.

In an exemplary embodiment of the present disclosure, the method further includes: obtaining the word vectors by training text data by using a word vector training algorithm. Word embedding is a collective name of a group of language modeling and feature learning technologies in natural language processing (NLP). In one embodiment of the present disclosure, the function of word embedding is to convert words in a natural language into dense vectors that can be understood by a computer. A common model for constructing a word vector is a word2vec model and a global vectors for word representation (GloVe) model.

The word2vec model can train a large quantity of corpuses, can make word vectors have relatively low dimensions, can capture a similarity between words, and can calculate similar words by performing algebraic operation on words. The GloVe model is a word vector training model provided after the word2vec model. The GloVe model provides an idea of helping to construct a word vector according to some statistical information in the corpus based on the word2vec model. That is, if a word is usually together with a context word in the context, the meaning of a case that the word is together with the context word is greater than a case that the word is together with another word. Then, in the process of determining a final word vector, a correlation between the two words is preferentially considered.

Based on the foregoing analysis of the features of word vector models, in an embodiment of the present disclosure, news data or article data in a public network may be trained through the GloVe algorithm, to obtain word vectors of words used in this embodiment of the present disclosure. In an embodiment of the present disclosure, the word vectors of the words may alternatively be obtained by using another word vector constructing algorithm, and this embodiment of the present disclosure is not limited thereto.

Figure 5:
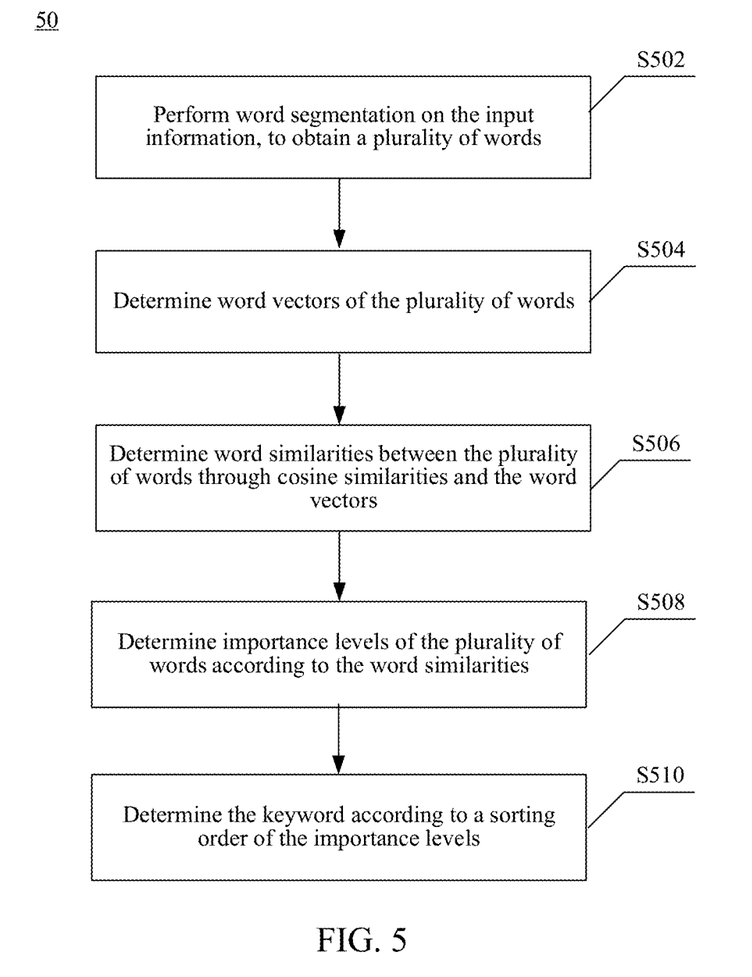
FIG. 5 is a flowchart of a man-machine conversation method according to another exemplary embodiment.

FIG. 5 is a flowchart of a man-machine conversation method according to another exemplary embodiment. The man-machine conversation method 50 shown in FIG. 5 is a detailed description of step S402 "extract a keyword from input information of a user" in the man-machine conversation method 40 shown in FIG. 4.

As shown in FIG. 5, in step S502, word segmentation is performed on the input information, to obtain a plurality of words. As described above, the information inputted by the user may be in an audio form or a text form. When the information inputted by the user is audio information, the audio information may be first converted into text, and then word segmentation is performed.

In an embodiment, the word segmentation may be Chinese word segmentation on Chinese characters. Chinese word segmentation refers to segmenting a Chinese character sequence into individual words. Word segmentation is a process of recombining consecutive character sequences into word sequences according to a specific standard. Existing word segmentation algorithms may be divided into three categories: a character string matching based word segmentation method, an understanding-based word segmentation method, and a statistics-based word segmentation method. According to whether word segmentation is combined with a part-of-speech tagging process, the word segmentation algorithms may alternatively be divided into a pure word segmentation method and an integral method in which word segmentation is combined with part-of-speech tagging.

In an embodiment, in the character string matching based word segmentation method, a Chinese character string to be analyzed and entries in a "sufficiently large" machine dictionary are matched according to a policy; and if a character string is found in the dictionary, the matching succeeds (a word is identified). In the understanding-based word segmentation method, a computer is made to simulate understanding of a sentence by people to identify a word. A basic idea thereof is performing syntax and semantic analysis while performing word segmentation, and an ambiguity phenomenon is processed by using syntax information and semantic information. In the statistics-based word segmentation method, statistics on the frequencies of combinations of characters that appear adjacently in a corpus is collected, and mutual appearance information of the characters is calculated.

Certainly, when the information inputted by the user is information in English or information in another language, word segmentation may alternatively be performed on the input information of the user by using a word segmentation method corresponding to the another language, and the specific word segmentation method does not affect processing steps of subsequent embodiments of the present disclosure. In one embodiment of the present disclosure, word segmentation may be performed on the input information by using one or more of the foregoing plurality of segmentation methods. This embodiment of the present disclosure is not limited thereto.

In step S504, word vectors of the plurality of words are determined. News data or article data in a public network may be trained by using a GloVe algorithm, to obtain word vectors of words used in one embodiment of the present disclosure.

In an embodiment, word vector tagging is performed on words obtained after word segmentation is performed on the word vectors obtained through training, to generate a word vector set.

In step S506, word similarities between the plurality of words is determined through cosine similarities and the word vectors. A cosine similarity between the word vectors may be used as a similarity between corresponding words. The cosine similarity is a similarity between two vectors by calculating a cosine value of an angle between the two vectors.

In an embodiment, a plurality of words may be sorted and numbered according to a sequence in which words in the article appear, and a No. 1 word vector may be used as a starting word vector, and similarities between the No. 1 word vector and other word vectors are separately compared. After all word vectors are traversed for a plurality of times, and the word vectors are compared pairwise, similarities therebetween are determined.

In an embodiment, two word vectors are separately drawn into a vector space such as a most common two-dimensional space, according to coordinate values thereof. An angle between the two word vectors is calculated, and a cosine value corresponding to the angle is obtained. The cosine value may be used for representing a similarity between the two vectors. For example, a smaller angle between the two word vectors indicates a cosine value therebetween closer to 1, and a larger similarity between the two word vectors.

In step S508, importance levels of the plurality of words are determined according to the word similarities. The importance levels of the words may be calculated by using the TextRank algorithm. The TextRank algorithm is to sort subsequent keywords by using a relationship (a co-occurrence window) between local words, and the keywords are directly extracted from text. The main steps may be as follows:

(1) Construct a candidate keyword graph G=(V, E), where V is a node set (a word vector set), and then construct an edge between any two nodes by using a co-occurrence relationship, that is, there is an edge between two nodes only when words corresponding to the two nodes co-occur in a window with a length of K, and K represents a size of the window, that is, at most K words co-occur.

(2) According to the steps and formulas shown in FIG. 7, set a weight of an edge between nodes to a similarity between word vectors, and propagate weights of the nodes through iteration, until convergence is achieved. For specific steps and methods, refer to FIG. 7 and the embodiment corresponding to FIG. 7. Details are not described herein again in this embodiment of the present disclosure.

(3) Performing inverse sorting on node weights, to obtain most important T word vectors, where weights of nodes are importance levels of word vectors.

In step S510, the keyword is determined according to a sorting order of importance levels. One or more word vectors may be selected according to a descending order of importance levels, and words corresponding to the word vectors are used as keywords in one embodiment.

In an embodiment, marking may alternatively be performed in original text according to obtained most important N words. If adjacent phrases are formed, a multi-word keyword is formed through combination. For example, there is a sentence "I want to know today's weather forecast" in information text inputted by the user. If "weather" and "forecast" are both candidate keywords, a combination "weather forecast" may be used as the keyword in one embodiment of the present disclosure.

According to the man-machine conversation method in one embodiment of the present disclosure, information inputted by the user is processed through the TextRank algorithm, to obtain the keyword of the input information of the user, so that a key point of the input information of the user can be accurately and quickly extracted, helping subsequent information retrieval.

Figure 6:
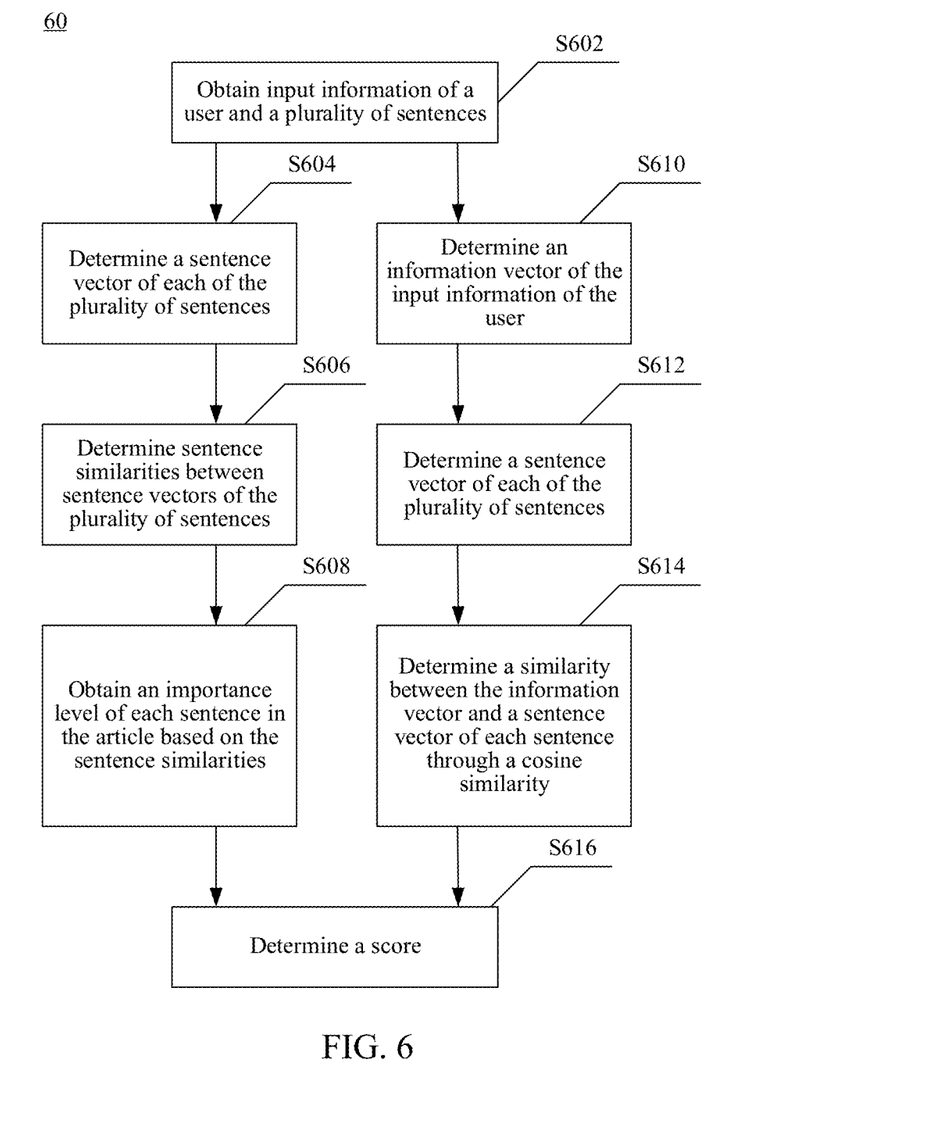
FIG. 6 is a flowchart of a man-machine conversation method according to another exemplary embodiment.

FIG. 6 is a flowchart of a man-machine conversation method according to another exemplary embodiment. The man-machine conversation method 60 shown in FIG. 6 is a detailed description of step S406 "determine a score of each of the plurality of sentences" in the man-machine conversation method 40 shown in FIG. 4.

As shown in FIG. 6, in step S602, input information of a user and a plurality of sentences are obtained. In one embodiment, the input information of the user is text information, or text information obtained by converting voice of the user. The plurality of sentences are the foregoing sentences extracted in the candidate article.

In step S604, a sentence vector of each of the plurality of sentences is determined. The sentence vector may be calculated through word vectors of words included in the sentence. The sentence vector may be obtained, for example, through different combinations of word vectors included in the sentence. Methods for calculating a sentence vector may include:

a neural bag-of-words model that simply averages word vectors of embedded words in a text sequence, sums up all words, and uses a result after sum-up as a representation of the entire sequence;

a recursive neural network model that performs recursion constantly according to a given external topology structure (such as a component syntactic tree), to obtain a representation of the entire sequence;

a recurrent neural network that regards a text sequence as a time sequence, and performs upgrade constantly, to finally obtain a representation of the entire sequence; and a convolutional neural network that finally obtains a vector with a fixed length through a plurality of convolutional layers and sub sampling layers.

In an embodiment, through the neural bag-of-words model that performs weighted representation in one embodiment of the present disclosure, a sentence vector is constructed by using word vectors. The content of this part will be described in detail in the embodiment of FIG. 7.

In step S606, sentence similarities between sentence vectors of the plurality of sentences is determined. A cosine similarity between the sentence vectors may be determined according to the method described above, to use the cosine similarity between the sentence vectors as a semantic similarity between sentences.

In step S608, an importance level of each sentence in the article is obtained based on the sentence similarities. A similarity matrix may be constructed according to the sentence similarities between sentences. A graphical model is constructed by using a sentence as a node and a corresponding similarity as a weight of an edge according to the similarity matrix. Based on the graphical model, a final importance level of each sentence is calculated by using an iterative method of PageRank. The content of this part will be described in detail in the embodiment of FIG. 7.

In an embodiment, the importance may be used as a first score.

In step S610, an information vector of the input information of the user is determined. Referring to the foregoing manner of generating a sentence vector, the input information of the user may be used as a sentence, and the information vector of the input information of the user is calculated through word vectors of words included in the sentence.

In step S612, a sentence vector of each of the plurality of sentences is determined. Referring to the foregoing manner of generating a sentence vector, the sentence vector may be calculated through word vectors of words included in the sentence.

In step S614, a similarity between the information vector and the sentence vector of each sentence is determined through the cosine similarity. A cosine similarity between the word vectors may be used as a similarity between corresponding words. The cosine similarity is a similarity between two vectors by calculating a cosine value of an angle between the two vectors.

In an embodiment, the similarity may be used as a second score.

In step S616, the score is determined. The first score and the second score are comprehensively considered. For example, the first score is A, the second score is B, and a final score C of each sentence may be represented as:

$$C=qA+(1-q)B;$$

where q is a weight coefficient.

According to the man-machine conversation method in one embodiment of the present disclosure, a semantic importance level of a sentence in a candidate article and a correlation between content asked by a user and the sentence in the candidate article are comprehensively considered, so that the sentence in the candidate article can be scored comprehensively from a plurality of aspects and a plurality of perspectives.

FIG. 7 is a flowchart of a man-machine conversation method according to another exemplary embodiment. The man-machine conversation method 70 shown in FIG. 7 is a detailed description of step S604 "determine a sentence vector of each of the plurality of sentences" and step S608 "obtain an importance level of each sentence in the article based on the sentence similarities" in the man-machine conversation method 60 shown in FIG. 6.

As shown in FIG. 7, in step S702, word segmentation is performed on a sentence to obtain a plurality of words. Word segmentation may be performed on the input information in one embodiment of the present disclosure by using one or more of the foregoing word segmentation methods. This embodiment of the present disclosure is not limited thereto.

In step S704, word vectors of the plurality of words are determined. News data or article data in a public network may be trained by using a GloVe algorithm, to obtain word vectors of words used in one embodiment of the present disclosure.

In step S706, term frequency-inverse document frequencies of the plurality of words are determined. The term frequency-inverse document frequencies of the plurality of words may be determined through a term frequency-inverse document frequency (TF-IDF) technology. The TF-IDF technology is a common weighting technology used for information retrieval and data mining. TF represents a term frequency, and IDF represents an inverse document frequency.

In one embodiment of the present disclosure, considering that semantics of words in a sentence have different degrees of impact on the semantics of the sentence, and a TF-IDF value of each word vector can reflect an importance level of the word in the sentence, in one embodiment, word vectors are weighted by using the TF-IDF, and a weighted average of the word vectors is used as the sentence vector.

In an embodiment, a manner for calculating the TF-IDF of a word vector is as follows:

$TF_w$=a quantity of times of a word vector $w$ appearing in a document/a total quantity of words in the document;

$IDF_w$=log(a total quantity of documents/(a total quantity of documents including the word vector $w$+1));

and $$TF\text{-}IDF=TF\times IDF$$

A term frequency-inverse document frequency of each word vector in the candidate article is determined through the foregoing formulas.

In step S708, the sentence vector of the sentence is determined according to the term frequency-inverse document frequencies and the word vectors. Semantics of words in a sentence in the candidate article have different degrees of impact on the semantics of the sentence, and a TF-IDF value of each word vector can reflect an importance level of the word. Therefore, in one embodiment of the present disclosure, word vectors are weighted by using the TF-IDF value, and a weighted average of the word vectors is used as the sentence vector. The specific formula is as follows:

$$V_s = \frac{\sum_{w \in s} TF\text{-}IDF_w V_w}{\sum_{w \in s} TF\text{-}IDF_w};$$

where $V_s$ represents a sentence vector of a sentence s, s represents a sentence in the candidate article, w represents a word, $V_w$ represents a word vector of the word w, and $TF\text{-}IDF_w$ represents a TF-IDF value of the word w.

In step S710, sentence similarities between sentence vectors of the plurality of sentences is determined. A cosine similarity between the sentence vectors may be used as the similarity between the sentences.

In step S712, a similarity matrix is constructed based on the similarity. If the candidate article includes n sentences, a n×n similarity matrix is constructed, and a value of an element $a_{ij}$ (an element in an $i^{th}$ row and a $j^{th}$ column) in the matrix is a similarity between an $i^{th}$ sentence and a $j^{th}$ sentence.

In step S714, a graphical model is constructed based on the similarity matrix by using a sentence as a node and by using a similarity as a weight of an edge.

The similarity matrix may be, for example, a 4×4 matrix, a node set is ($a_1$, $a_2$, $a_3$, $a_4$), and a corresponding edge set is ($a_{12}$, $a_{13}$, . . . , $a_{34}$):

$$\begin{vmatrix} 1 & 0.3 & 0.5 & 0.1 \\ 0.3 & 1 & 0.7 & 0.5 \\ 0.5 & 0.7 & 1 & 0.4 \\ 0.1 & 0.5 & 0.4 & 1 \end{vmatrix}.$$

The graphical model constructed based on the similarity matrix has four nodes, which may be respectively $a_1$, $a_2$, $a_3$, and $a_4$. A corresponding matrix value between $a_1$, $a_2$, $a_3$, and $a_4$ is used as the weight of the edge between nodes. Therefore, in the graphical model, an edge au between $a_1$ and $a_2$ may be denoted as 0.3; an edge $a_{13}$ between $a_1$ and $a_3$ may be denoted as 0.5; an edge $a_{14}$ between $a_1$ and $a_4$ may be denoted as 0.1, and by analogy, a value may be assigned to each edge between nodes in the graphical model, to construct the graphical model.

In step S716, an importance level of a sentence in the article is obtained through iteration based on the graphical model. The cosine similarity between the sentence vectors may be used as the similarity between sentences, to calculate the importance level of the sentence in the article through iteration.

For example, the similarity between sentences may be calculated through the following formula. This embodiment of the present disclosure is not limited thereto:

$$\text{Similarity}(S_i, S_j) = \frac{|\{w_k \mid w_k \in S_i \ \& \ w_k \in S_j\}|}{\log(|S_i|) + \log(|S_j|)};$$

where $S_i$ represents the $i^{th}$ sentence, $S_j$ represents the $j^{th}$ sentence; and $w_k$ represents a $k^{th}$ word in the sentence;

$|S_i|$ and $|S_j|$ represent a quantity of words in the sentence; and $w_k \in S_i \ \& \ w_k \in S_j$ represents words that appear in both $S_i$ and $S_j$.

According to the foregoing formula, traverse iteration calculation is performed on sentences in the candidate article, to determine the similarity between the sentences.

For the graphical model in one embodiment of the present disclosure, namely, a directed weighted graph G=(V, E) is composed of a node set V (sentences) and an edge set E (similarities), where E is a subset of V×V. In the graph, a weight of an edge between any two nodes $V_i$ and $V_j$ is $w_{ji}$. For a given node $V_i$, In($V_i$) is a node set pointing to the node, and Out($V_i$) is a node set pointed by the node $V_i$. An importance score of the node $V_i$ (sentence) is defined as follows:

$$ws(V_i) = (1 - d) + d * \sum_{V_j \in In(V_i)} \frac{w_{ji}}{\sum_{V_k \in Out(V_j)} w_{jk}} ws(V_j);$$

where ws(Vi) represents an importance score of the sentence Vi, and ws(Vj) represents an importance score of the sentence Vj;

d is a damping coefficient, a value range of d is 0 to 1, and d represents a probability that a specific node in the graph points to any other node, and may be set according to an experience value, for example, may be set to 0.85;

$V_{j \in In(V_i)}$ represents a set of all nodes (sentences) pointing to the node (sentence) $V_i$, and $V_k \in Out(V_j)$ represents a set of all nodes (sentences) pointed by the node (sentence) $V_j$; and $w_{ji}$ and $w_{jk}$ are weights of an edge between $V_i$ and $V_j$ and an edge between $V_j$ and $V_k$.

When a score of each node in the graph is calculated by using the TextRank algorithm, any initial value needs to be assigned to a node in the graph, and recursive calculation is performed until convergence is achieved. When an error rate of any node in the graph is less than a given preset value, convergence may be achieved.

In an embodiment, during the iterative calculation, the importance level of each sentence is initialized to 1. In an embodiment, it is determined that a preset value of convergence is 0.0001.

According to the man-machine conversation method in one embodiment of the present disclosure, semantics of sentences are considered when key sentences of the input information of the user are extracted. In the conventional TextRank algorithm, during similarity calculation of a sentence, semantics of the sentence is not considered. However, according to the man-machine conversation method in one embodiment of the present disclosure, a term frequency-inverse document frequency (TF-IDF) is used as a weight of a word, and a weighted average of word vectors of words included in the sentence is used as a vector representation of the sentence, and a similarity between sentences is calculated by using the vector.

In one embodiment of the present disclosure, a GloVe model is used when a word vector is trained, and another word vector model such as a continuous bag of words (CBOW) model or Skip-Gram may alternatively be used herein.

In one embodiment of the present disclosure, a weighted average of word vectors is used as a vector representation of a sentence. According to the man-machine conversation method in one embodiment of the present disclosure, another sentence vector representing method such as a Skip-Thought method may alternatively be used.

In one embodiment of the present disclosure, when the importance level of a sentence in the article is calculated by using the TextRank algorithm, a cosine similarity between sentence vectors is used as a semantic similarity between sentences. A norm is an intensified distance concept, and in definition, has one more scalar multiplication algorithm than a distance. Mathematically, a norm includes a vector norm and a matrix norm. The vector norm represents a size of a vector in a vector space, and the matrix norm represents a size of a change caused by a matrix. In actual use, it may also be considered that the similarity is represented by using another distance measurement such as a norm L1 or a norm L2 between vectors.

A person skilled in the art may understand that all or some of the steps of the foregoing embodiments are implemented as computer programs executed by a CPU. When the computer programs are executed by the CPU, the foregoing functions defined by the foregoing methods provided in the embodiments of the present disclosure are implemented. The programs may be stored in a computer-readable storage medium. The storage medium may be a read-only memory, a magnetic disk, an optical disc, or the like.

In addition, the foregoing accompanying drawings are merely schematic descriptions of processing included in the methods of exemplary embodiments in the present disclosure, and are not used for a limitative purpose. It is easy to understand that the processing shown in the foregoing accompanying drawings does not indicate or limit a chronological order of such processing. In addition, it is also easy to understand that such processing may be, for example, synchronously performed or asynchronously performed in a plurality of modules.

The following is apparatus embodiments of the present disclosure that can be used for performing the method embodiments of the present disclosure. For details not disclosed in the apparatus embodiments of the present disclosure, reference may be made to the method embodiments of the present disclosure.

Figure 8:
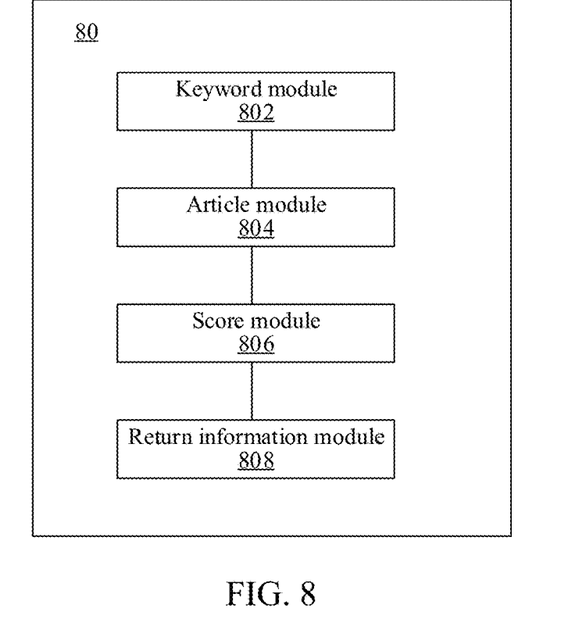
FIG. 8 is a block diagram of a man-machine conversation apparatus according to an exemplary embodiment.

FIG. 8 is a block diagram of a man-machine conversation apparatus according to an exemplary embodiment. The man-machine conversation apparatus 80 includes: a keyword module 802, an article module 804, a score module 806, and a return information module 808.

The keyword module 802 is configured to extract a keyword from input information of a user, and may extract the keyword from voice input information of the user, or extract the keyword from text input information of the user.

The article module 804 is configured to determine a candidate article according to the keyword, and may retrieve in a predetermined platform according to the keyword, to determine the candidate article. Specifically, several hot news articles related to the keyword may be found in recent official account articles; the keyword may also be searched for in mainstream searching engines, and sorting is performed according to found results, and the candidate article is determined in retrieval results according to a descending sorting order. There may be one or more candidate articles, and this embodiment of the present disclosure is not limited thereto.

The score module 806 is configured to obtain a plurality of sentences in the candidate article, and determine a score of each of the plurality of sentences. The score module 806 may be specifically configured to: determine a first score according to an importance level of each of the plurality of sentences in the article; determine a second score according to a similarity between each of the plurality of sentences and the input information; and determine the score according to the first score and the second score.

The return information module 808 is configured to extract part of the plurality of sentences based on a score result, to generate return information. The plurality of sentences may be sorted based on the score result, and part of the plurality of sentences may be extracted in sequence (for example, in the descending order) to generate the return information.

According to the man-machine conversation apparatus in one embodiment of the present disclosure, articles related to the user question are retrieved, and then part of sentences are extracted in the related articles, to generate return information having essential content and an information amount, so that the robot generates an answer having an information amount in the man-machine conversation process, to assist the user in exchanging opinions with external information.

Figure 9:
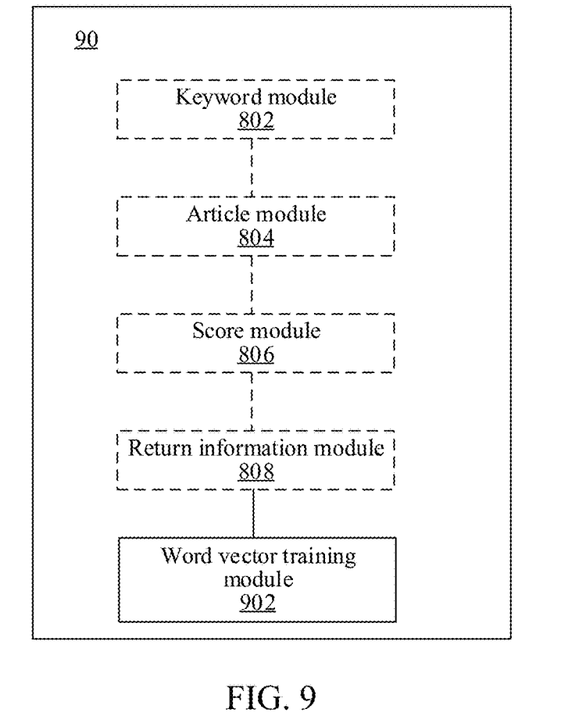
FIG. 9 is a block diagram of a man-machine conversation apparatus according to another exemplary embodiment.

FIG. 9 is a block diagram of a man-machine conversation apparatus according to another exemplary embodiment. The man-machine conversation apparatus 90 shown in FIG. 9 further includes a word vector training module 902 based on the man-machine conversation apparatus 80 shown in FIG. 8.

The word vector training module 902 is configured to obtain the word vector by training text data through a word vector training algorithm. In an embodiment of the present disclosure, news data or article data in a public network may be trained through a GloVe algorithm, to obtain word vectors of words used in one embodiment of the present disclosure. In an embodiment of the present disclosure, the word vectors of the words used in one embodiment of the present disclosure may alternatively be obtained by using another word vector constructing algorithm, and this embodiment of the present disclosure is not limited thereto.

Figure 10:
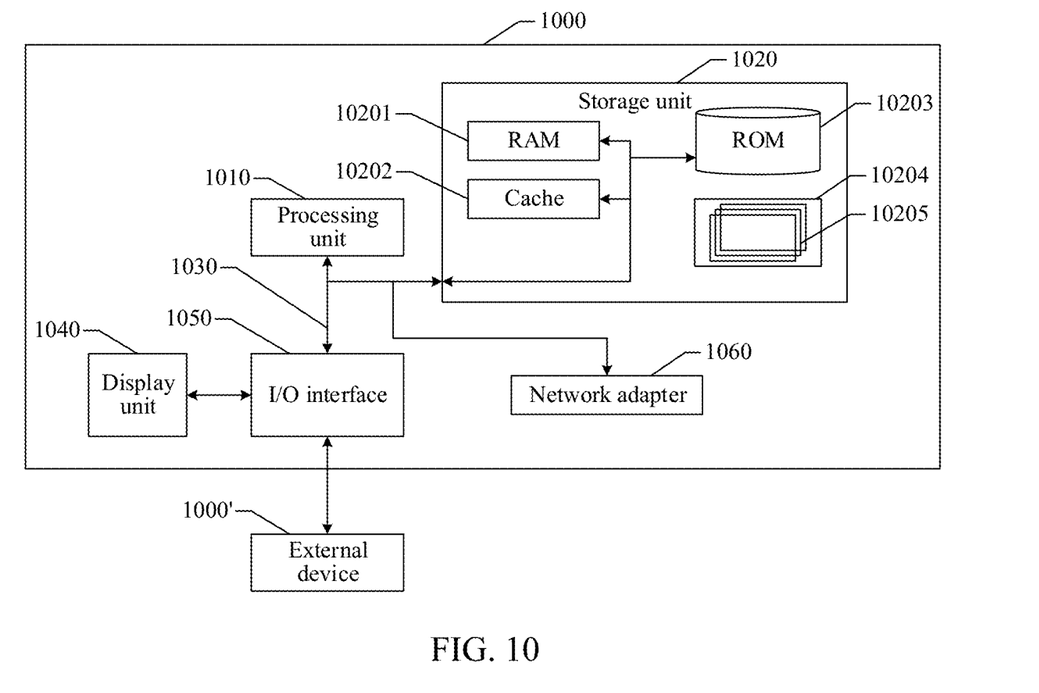
FIG. 10 is a block diagram of an electronic device according to an exemplary embodiment.

FIG. 10 is a block diagram of an electronic device according to an exemplary embodiment.

The electronic device 1000 according to one embodiment of the present disclosure is described below with reference to FIG. 10. The electronic device 1000 shown in FIG. 10 is only an example, and does not impose any restriction on functions and scopes of use of the embodiments of the present disclosure.

As shown in FIG. 10, the electronic device 1000 is represented in a form of a computing device. Components of the electronic device 1000 may include, but are not limited to: at least one processing unit 1010 (such as a CPU), at least one storage unit 1020, a bus 1030 connected to different system components (including the system memory 1020 and the processing unit 1010), a display unit 1040, and the like.

The storage unit 1020 stores program code, where the program code may be executed by the processing unit 1010, so that the processing unit 1010 performs the steps of the man-machine conversation method described in any embodiment of this specification. For example, the processing unit 1010 may perform the steps shown in FIG. 4, FIG. 5, FIG. 6, and FIG. 7.

The storage unit 1020 may include a readable medium in a form a volatile storage unit, such as a random access memory (RAM) 10201 and/or a cache 10202, and may further include a read-only memory (ROM) 10203.

The storage unit 1020 may further include a program/utility 10204 having a set of (at least one) program modules 10205. Such program modules 10205 include, but are not limited to an operating system, one or more applications, another program module, and program data. Each of such examples or a combination thereof may include an implementation of a network environment.

The bus 1030 may indicate one or more of several types of bus structures, including a storage unit bus or storage unit controller, a peripheral bus, an accelerated graphics port, a processing unit, or a local bus using any of a plurality of bus structures.

The electronic device 1000 may alternatively communicate with one or more external devices 1000' (such as a keyboard, a pointing device, and a Bluetooth device), may alternatively communicate with a plurality of devices that enable a user to interact with the electronic device 1000, and/or communicate with any device (such as router or a modem) that enables the electronic device 1000 to communicate with one or more other computing devices. Such communication may be performed through an input/output (I/O) interface 1050. In addition, the electronic device 1000 may further communicate with one or more networks such as a local area network (LAN), a wide area network (WAN), and/or a public network (such as the Internet) through a network adapter 1060. The network adapter 1060 may communicate with another module of the electronic device 1000 through the bus 1030. It is to be understood that although not shown in the figure, other hardware and/or software modules may be used in combination with the electronic device 1000, including, but not limited to microcode, a device driver, a redundancy processing unit, an external disk drive array, a RAID system, a tape drive, a data backup storage system, or the like.

Through descriptions of the foregoing implementations, it is easy for a person skilled in the art to understand that the exemplary implementations described herein can be implemented by software or by combining software with necessary hardware. Therefore, the technical solutions of the embodiments of the present disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server device, a network device, or the like) to perform the methods according to the embodiments of the present disclosure.

Figure 11:
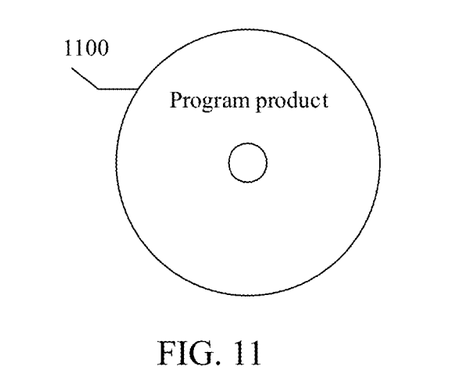
FIG. 11 is a schematic diagram of a computer-readable storage medium according to an exemplary embodiment.

FIG. 11 is a schematic diagram of a computer-readable storage medium according to an exemplary embodiment of the present disclosure.

FIG. 11 describes a program product 1100 configured to implement the foregoing methods according to the embodiments of the present disclosure, and the program product may use a portable compact disk read-only memory (CD-ROM) and includes program code, and may run on a terminal device such as a personal computer. However, the program product in this embodiment of the present disclosure is not limited thereto. In this specification, the readable storage medium may be any tangible medium containing or storing a program, and the program may be used by or used in combination with an instruction execution system, an apparatus, or a device.

The computer-readable medium carries one or more programs. When the one or more programs are executed by a computing device, the computing device is caused to implement the following functions: extracting a keyword from input information of a user; determining a candidate article according to the keyword; obtaining a plurality of sentences in the candidate article, and determining a score of each of the plurality of sentences; and extracting part of the plurality of sentences based on a score result to generate return information.

A person skilled in the art may understand that the foregoing modules may be distributed in the apparatus according to the descriptions of the embodiments, or a corresponding change may be made, so that the modules are distributed in one or more apparatuses different from that in this embodiment. The modules in the foregoing embodiments may be integrated as one and may also be further divided into a plurality of submodules.

The exemplary embodiments of the present disclosure have been specifically shown and described above. It is to be understood that, the present disclosure is not limited to the detailed structures, configurations or implementation methods described herein. On the contrary, the present disclosure is intended to cover various modifications and equivalent configurations within the spirit and scope of the appended claims.

What is claimed is:

1. A man-machine conversation method, performed by an electronic device, the method comprising:
    extracting a keyword from input information of a user, comprising:
        performing word segmentation on the input information, to obtain a plurality of input words;
        determining word vectors of the plurality of input words and similarities between the word vectors;
        using the word vectors as vertices, using co-occurrence relationships of node pairs as edges, setting weights of the edges based on to the similarities between the corresponding word vectors, to construct a keyword graph, wherein a co-occurrence relationship of a node pair indicates words corresponding to two nodes of the node pair co-occur in a window with a length of K, K representing a size of the window;
        assigning random initial weights for the nodes and propagating the weights of the nodes through recursive calculation, until an error rate of a node in the keyword graph is less than a preset value, determining importance levels of the words based on the weights of nodes; and
        determining the keyword according to a sorting order of the importance levels;
    determining a candidate article according to the keyword;
    obtaining a plurality of sentences in the candidate article, and determining a score of each of the plurality of sentences, wherein determining the score comprises determining a score according to a similarity between the each of the plurality of sentences and the input information;
    extracting part of the plurality of sentences based on the score of each of the plurality of sentences; and
    generating return information that includes the extracted part of the plurality of sentences.

2. The method according to claim 1, wherein the score according to the similarity is a second score, and wherein determining the score of the each of the plurality of sentences comprises:
    determining a first score according to an importance level of the each of the plurality of sentences in the article; and
    determining the score of the each of the plurality of sentences as a function of the first score and the second score.

3. The method according to claim 2, wherein determining the first score comprises:
    determining a sentence vector of the each of the plurality of sentences; and
    determining the first score according the sentence vector of the each of the plurality of sentences.

4. The method according to claim 3, wherein determining the sentence vector comprises:
    performing word segmentation on the each of the plurality of sentences, to obtain a plurality of words;
    determining word vectors of the plurality of words; and
    determining the sentence vector of the each of the plurality of sentences according to the word vectors.

5. The method according to claim 2, wherein the function is a weighted sum of the first score and the second score.

6. The method according to claim 1, wherein determining the score according to the similarity between the each of the plurality of sentences and the input information comprises:
    determining an information vector of the input information of the user;
    determining a sentence vector of each of the plurality of sentences; and
    determining the score according to the information vector and the sentence vector.

7. The method according to claim 1, wherein the candidate article is determined in a predetermined platform according to the keyword, the predetermined platform including a news platform, an official account platform, and a music platform.

8. The method according to claim 1, further comprising:
    determining sentence similarities of the plurality of sentences;
    constructing a graphical model based on the similarity matrix by using each sentence as a node and using each of the sentence similarities as a weight of an edge; and
    determining the score of the each of the plurality of sentences according to the graphical model.

9. The method according to claim 1, wherein obtaining the plurality of sentences in the candidate article comprises:
    dividing the candidate article is into constituent units in words or sentences;
    establishing a graphical model according to the constituent units; and
    determining the score of the each of the plurality of sentences according to the graphical model.

10. The method according to claim 1, wherein the input information includes a question.

11. The method according to claim 10, wherein the question includes a viewpoint about a thing.

12. The method according to claim 10, wherein the question includes a word "what" or a word "how."

13. The method according to claim 1, wherein the plurality of sentences is extracted from a movie information platform.

14. The method according to claim 1, wherein the extract part includes a summary of a movie, the summary including an introduction or a comment on the movie.

15. An electronic device, comprising: one or more processors; and a storage apparatus, configured to store one or more programs; the one or more processors are, when executing the one or more programs, configured to perform:
  extracting a keyword from input information of a user;
    determining a candidate article according to the keyword, comprising:
      performing word segmentation on the input information, to obtain a plurality of input words;
      determining word vectors of the plurality of input words and similarities between the word vectors;
      using the word vectors as vertices, using co-occurrence relationships of node pairs as edges, setting weights of the edges based on to the similarities between the corresponding word vectors, to construct a keyword graph, wherein a co-occurrence relationship of a node pair indicates words corresponding to two nodes of the node pair co-occur in a window with a length of K, K representing a size of the window;
      assigning random initial weights for the nodes and propagating the weights of the nodes through recursive calculation, until an error rate of a node in the keyword graph is less than a preset value, determining importance levels of the words based on the weights of nodes; and
      determining the keyword according to a sorting order of the importance levels;
  obtaining a plurality of sentences in the candidate article, and determining a score of each of the plurality of sentences, wherein determining the score comprises determining a score according to a similarity between the each of the plurality of sentences and the input information;
  extracting part of the plurality of sentences based on the score of each of the plurality of sentences; and
  generating return information that includes the extracted part of the plurality of sentences.

16. The device according to claim 15, wherein the score according to the similarity is a second score, and wherein determining the score of the each of the plurality of sentences comprises:
  determining a first score according to an importance level of the each of the plurality of sentences in the article; and
  determining the score of the each of the plurality of sentences as a function of the first score and the second score.

17. The device according to claim 16, wherein determining the first score comprises:
  determining a sentence vector of the each of the plurality of sentences; and
  determining the first score according the sentence vector of the each of the plurality of sentences.

18. The device according to claim 17, wherein determining the sentence vector comprises:
  performing word segmentation on the each of the plurality of sentences, to obtain a plurality of words;
  determining word vectors of the plurality of words; and
  determining the sentence vector of the each of the plurality of sentences according to the word vectors.

19. A non-transitory computer-readable medium, storing a computer program, the program, when executed by a processor, cause the processor to perform:
  extracting a keyword from input information of a user, comprising:
    performing word segmentation on the input information, to obtain a plurality of input words;
    determining word vectors of the plurality of input words and similarities between the word vectors;
    using the word vectors as vertices, using co-occurrence relationships of node pairs as edges, setting weights of the edges based on to the similarities between the corresponding word vectors, to construct a keyword graph, wherein a co-occurrence relationship of a node pair indicates words corresponding to two nodes of the node pair co-occur in a window with a length of K, K representing a size of the window;
    assigning random initial weights for the nodes and propagating the weights of the nodes through recursive calculation, until an error rate of a node in the keyword graph is less than a preset value, determining importance levels of the words based on the weights of nodes; and
    determining the keyword according to a sorting order of the importance levels;
  determining a candidate article according to the keyword;
  obtaining a plurality of sentences in the candidate article, and determining a score of each of the plurality of sentences, wherein determining the score comprises determining a score according to a similarity between the each of the plurality of sentences and the input information;
  extracting part of the plurality of sentences based on the score of each of the plurality of sentences; and
  generating return information that includes the extracted part of the plurality of sentences.

* * * * *